United States Patent [19]

Furuta et al.

[11] Patent Number: 5,056,089
[45] Date of Patent: Oct. 8, 1991

[54] MEMORY DEVICE

[75] Inventors: Shigeru Furuta; Kenichi Takahira; Atsuo Yamaguchi; Takesi Inoue; Toshiyuki Matsubara; Shuzo Fujioka, all of Itami City, Japan

[73] Assignee: Mitsubishi Denki Kabushiki Kaisha, Japan

[21] Appl. No.: 306,565

[22] Filed: Feb. 6, 1989

[30] Foreign Application Priority Data

Feb. 8, 1988 [JP] Japan .................................. 63-26903

[51] Int. Cl.⁵ ............................................. G06F 11/00
[52] U.S. Cl. ........................................ 371/3; 371/21.1
[58] Field of Search ................... 371/3, 15.1, 22.4, 27, 371/22.3, 21.1

[56] References Cited

U.S. PATENT DOCUMENTS

| | | | |
|---|---|---|---|
| 3,825,894 | 7/1974 | Johnson, Jr. ............................ | 371/3 |
| 4,327,408 | 4/1982 | Frissell et al. ......................... | 371/3 |
| 4,513,418 | 4/1985 | Bardell, Jr. et al. ................. | 371/22.3 |
| 4,527,269 | 7/1985 | Wood et al. ............................ | 371/3 |
| 4,531,213 | 7/1985 | Scheuneman .......................... | 371/3 |
| 4,601,034 | 7/1986 | Sridhar .................................. | 371/22.4 |
| 4,688,207 | 8/1987 | Yoshimoto ............................. | 371/3 |
| 4,706,248 | 11/1987 | Maskai ................................... | 371/3 |
| 4,736,376 | 4/1988 | Stiffer ................................... | 371/3 |
| 4,809,273 | 2/1989 | Jackowski et al. ..................... | 371/3 |
| 4,878,220 | 10/1989 | Hashimoto ............................. | 371/3 |

FOREIGN PATENT DOCUMENTS 59-110010 6/1984 Japan .
61-182151 8/1986 Japan .

OTHER PUBLICATIONS

Bottorff et al., Self-Testing Scheme Using Shift Register Latches, IBM Technical Disclosure Bulletin, vol. 25 No. 10 Mar. 1983, pp. 4958-4960.
Bhavsar et al., Self-Testing By Polynomial Division 1981 International IEEE, pp. 208-316.

Primary Examiner—Jerry Smith
Assistant Examiner—Phung My Chung
Attorney, Agent, or Firm—Leydig, Voit & Mayer

[57] ABSTRACT

A memory system storing data detects and corrects an error in the stored data. The memory device includes a coding circuit for generating a systematic code including a data word and an error checking and correcting (ECC) code when the data word is supplied from a data bus during data writing, a memory cell array for storing the systematic code, and a sense amplifier for reading the systematic code from the memory cell. An error checking and correcting system generates a syndrome from the systematic code, decodes the syndrome to determine whether an error exists, identifies a bit position at which an error has occurred, and corrects the error contained in the data word by inverting a bit of the data word in the position at which the error has occured. The system includes a multiplexer for outputting the corrected data word to the data bus and a code reading circuit, for example, an ECC code register, for reading the ECC code generated by the coding circuit directly into the data bus. With this arrangement, it is possible to immediately and independently check the function of the coding circuit without influence from the memory cell array.

12 Claims, 6 Drawing Sheets

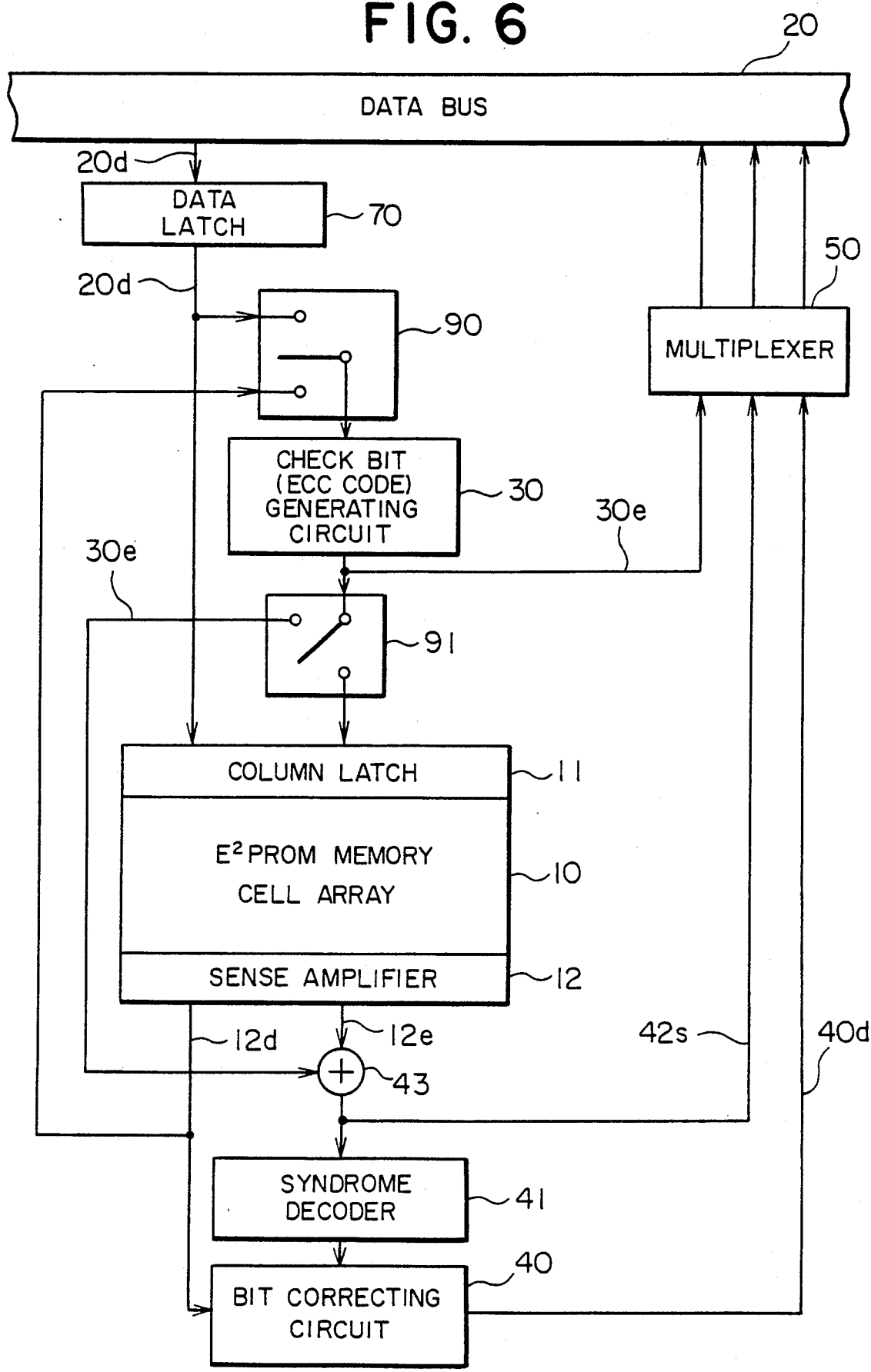

MEMORY DEVICE

BACKGROUND OF THE INVENTION

1. Field of the Invention

The present invention relates to a non-volatile semiconductor memory device such as an E²PROM having an error detecting and correcting function.

2. Description of the Relates Art

FIG. 1 is a block diagram showing the construction of an E²PROM of a conventional type which has an error detecting and correcting circuit. The E²PROM is included as a memory section in a microcomputer. It is assumed that a method of detecting and correcting an error employs an extended Hamming code which enables single error correction and double error detection. As shown in FIG. 1, a memory means is constituted by an E²PROM memory cell array 10 equipped with a column latch 11 and a sense amplifier 12. A check bit generating circuit 30 is disposed between the column latch 11 and a data bus 20. (The check bit constitutes an error checking and correcting code which is hereinafter referred to as an ECC code). The sense amplifier 12 serves to read data from the memory cell array 10. The illustrated circuit of the conventional type further includes an error detecting and correcting system comprising a syndrome generating circuit 42, a syndrome decoder 41, and a bit correcting circuit 40 for detecting and correcting an error in data read from the memory cell array 10, and a multiplexer 50 for selectively outputting a syndrome 42s or corrected data 40d. In such a construction, write data 20d is supplied from a CPU (not shown) through the data bus 20 to both the column latch 11 and the ECC code generating circuit 30. The ECC code generating circuit 30 generates an ECC code 30e from the write data 20d on the basis of a generator matrix and outputs the ECC code 30e to the column latch 11. Accordingly, a systematic code composed of the write data 20d and the ECC code 30e added thereto is supplied to the column latch 11. Thereafter, the systematic code is held in the column latch 11 for a write time and thus predetermined amounts of data 20d and 30e are collectively written into the memory cell array 10.

Writing to such an E²PROM is commonly carried out in the following manner. When a predetermined time period has elapsed after write data has been written into a column latch, the data held in the column latch is automatically written into memory cells during a write time of approximately several microseconds (us). For the sake of discrimination, the writing to the column latch is called external writing, and the writing to the memory cell is called internal writing. In the case of an E²PROM having a page rewrite mode, a sequence of data can be written into the column latch during external writing and, when the interval of data writing exceeds a predetermined time period, the transition from the external writing into internal writing is automatically effected. Thus, the data written in the column latch is collectively written into memory cells.

During reading, readout data 12d and a readout ECC code 12e are read from the memory cell array 10 and are then output to the syndrome generating circuit 42. In accordance with a check matrix, the syndrome generating circuit 42 calculates a syndrome from the readout data 12d and the readout ECC code 12d. The decoder 41 decodes the syndrome 42s and selects a bit position at which an error exists. However, in a case where there is no error, where errors exist in many bits, or where an error exists in the check bit, none of the bits is selected. The bit correcting circuit 40 inverts the bit in the position selected by the decoder 41, and outputs the corrected data 40d to the multiplexer 50. Then, the CPU reads the corrected data 40d into the data bus 20 through the multiplexer 50, thereby effecting reading. Thus, it is possible to correct an error due to the malfunction or the like of a memory cell in the E²PROM memory cell array 10 and read out corrected data.

Japanese Published Patent Applications 61-192099 and 62-120699 disclose means for outputting the readout ECC code 12e to the data bus 20. Further it has been also published to provide an arrangement having a structure which allows the syndrome 42s to be read out. Since the aforesaid code 42s which is ordinarily called a syndrome is described in, for example, Japanese Patent Publication No. 62-32823, the detailed description is omitted.

The conventional type of E²PROM having an error detecting and correcting circuit is constructed in the above described manner, and the ECC code 30e generated by the ECC generating circuit 30 is necessarily read into the E²PROM memory cell array 10 (that is, internal writing is executed.) For this reason, it is impossible to independently check a single function of the ECC code generating circuit 30, so that the overall E²PROM (the ECC code generating circuit 30, the syndrome generating circuit 42, the decoder 41, the bit correcting circuit 40, and the E²PROM memory cell array 10) must be checked by verifying both the write data 20d and the corrected data 40d, or by reading out the ECC code from the memory cells, or by reading out the syndrome. In addition, this method requires that write data serving as numerous test patterns be prepared and, furthermore, the method necessarily needs internal writing to the E²PROM memory cell array. Accordingly, there is a problem in that checking requires a long time period and the efficiency of checking is inferior.

SUMMARY OF THE INVENTION

It is, therefore, an object of the present invention to provide a memory device having an error detecting and correcting function which can independently check a single function of an ECC code generating circuit without writing any data into a memory cell array (without effecting internal writing), thereby enhancing the efficiency of checking the memory device.

To achieve the above object, in accordance with the present invention, there is provided a memory device having the function of detecting and correcting an error in stored information under the control of a microprocessor. The memory device is provided with coding means for generating a systematic code composed of an information bit and a check bit in response to information supplied from a data bus during data writing, memory means for storing the systematic code, readout means for reading the systematic code from the memory means, decoding means for calculating a syndrome from the systematic code read by the readout means, and detecting and correcting an error contained in the information bit, and decoding the error, output means for outputting the decode for reading the check bit generated by the coding means directly into the data bus, whereby functional checking of the coding means can be immediately performed without being influenced by the memory means.

The check bit (ECC code) reading means used in the present invention can read the ECC code generated by the coding means directly into the data bus. Accordingly, it is possible to check the function of a portion for generating the check bit of the decoding means without being influenced by any other means.

The foregoing and other objects, advantages and features of the present invention will be understood from the following detailed description when read in connection with the accompanying drawings.

BRIEF DESCRIPTION OF THE DRAWINGS

FIG. 6 is a block diagram showing the construction of another embodiment in which the present invention is applied to an E$^2$PROM employing a single ECC code generating circuit during both writing and reading.

DESCRIPTION OF THE PREFERRED EMBODIMENTS

Preferred embodiments of the present invention will be described in detail below with reference to the accompanying drawings.

Figure 1:
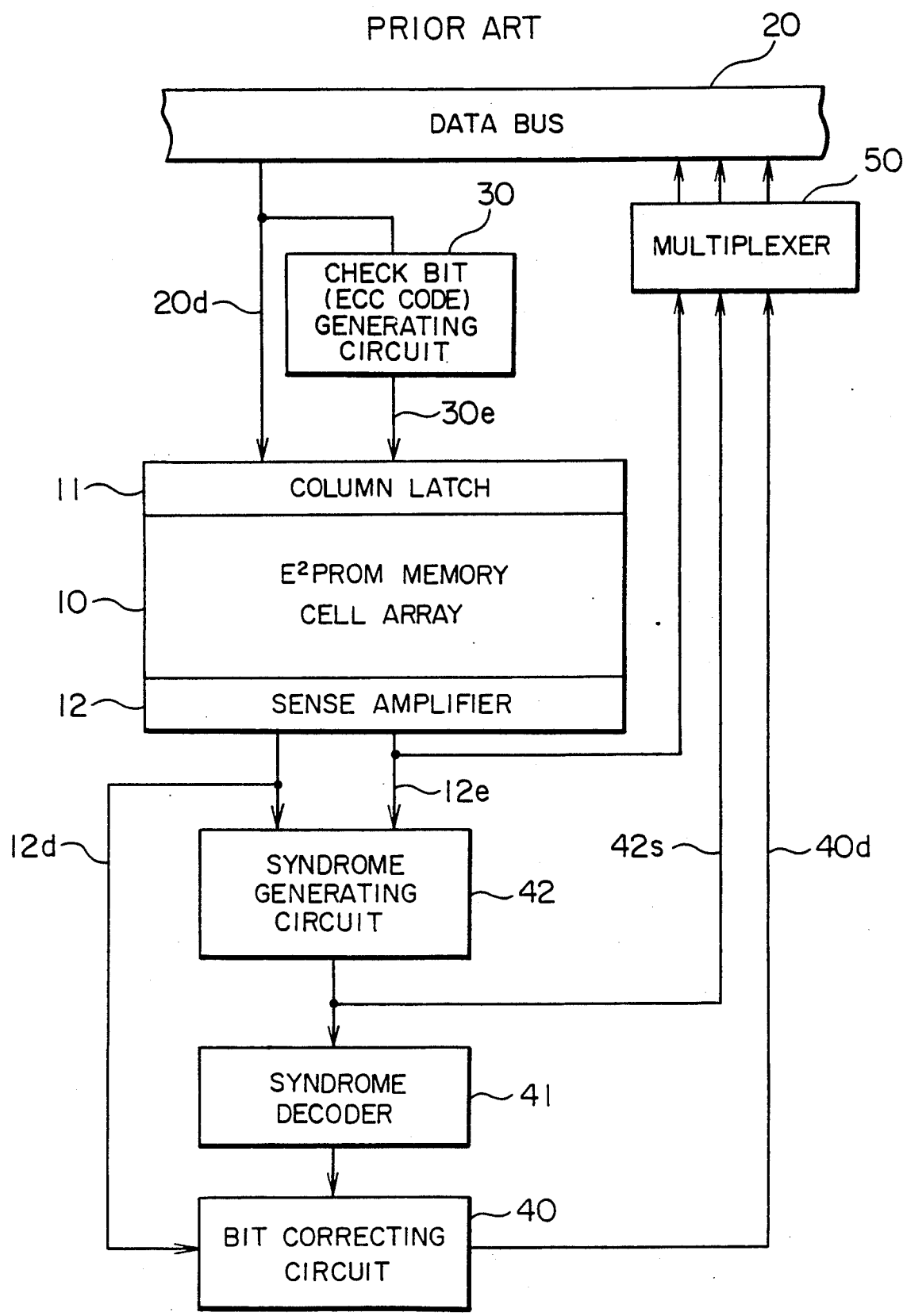
FIG. 1 is a block diagram showing the construction of an E$^2$PROM having a conventional type of error detecting and correcting function.
Figure 2:
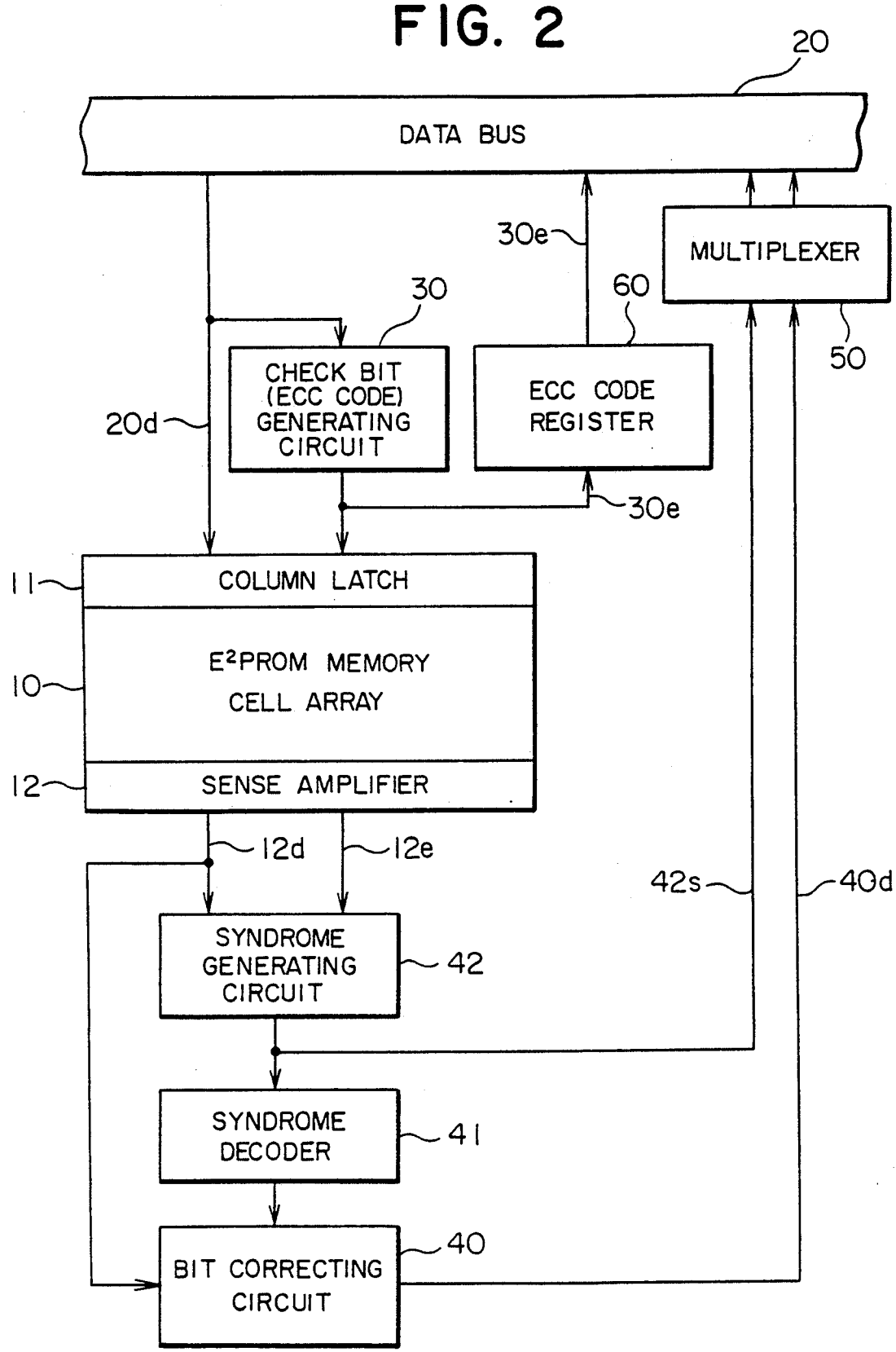
FIG. 2 is a block diagram showing the construction of an E$^2$PROM having an error detecting and correcting function according to one embodiment of the present invention.

FIG. 2 is a block diagram showing the construction of an E$^2$PROM having an error detecting and correcting function according to one embodiment of the present invention. As illustrated, an ECC code register (check bit register) 60 is disposed between the output side of an ECC code generating circuit 30 and a data bus 20. The ECC code register 60 stores an ECC code 30e which is generated by the ECC code generating circuit 30, and outputs the ECC code 30e to the data bus 20 in accordance with the command of a CPU (not shown). The construction of the remaining portion is the same as that of the conventional example shown in FIG. 1 and, therefore, the description thereof is omitted.

In the above-described construction, checking of a single function of the ECC code generating circuit 30 is executed in the following manner. Write data 20d is supplied from the CPU (not shown) to the data bus 20 in accordance with a predetermined pattern to execute external writing. During this time, the write data 20d is supplied to both a column latch 11 and the ECC code generating circuit 30, and the ECC code 30e is output from the ECC code generating circuit 30 to both the column latch 11 and the ECC code register 60 on the basis of the write data 20d, the ECC code 30e being held in the ECC code register 60.

In this state, if the ECC code register 60 is accessed through the CPU, the ECC code 30e which has previously been calculated is read out through the data bus 20. The readout ECC code 30e is compared with an ECC code expected to be generated on the basis of the write data 20d, thereby making a decision as to whether or not the ECC code 30e coincides with the expected ECC code. Thus, it is checked whether or not the ECC code generating circuit 30 performs an accurate operation.

As described above, since the ECC code 30e which is the output of the ECC code generating circuit 30 can be directly read into the data bus 20, it is possible to independently check a single function of the ECC code generating circuit 30. In consequence, since the ECC code generating circuit 30 can be eliminated from among the items to be checked in a check of the overall E$^2$PROM which has heretofore been performed, it is possible to greatly reduce the number of test patterns which must actually be written into the memory cells (which require internal writing). The checking time period can be shortened and the efficiency of checking can be improved. The memory device having the above-described arrangement is effective for use with an EPROM or an E$^2$PROM which requires a long time to complete data writing.

In the case of an E$^2$PROM having a page-mode writing function, the ECC code register 60 may be constituted by, for example, a linear feedback shift register (LFSR). In such an arrangement, the ECC code 30e generated by the ECC code generating circuit 30 on the basis of a plurality of write data 20d is converted into compressed data in accordance with a control clock supplied from a microprocessor, and is then stored in the LFSR. After all of a plurality of test patterns have been input, the contents of the LSFR are read out and compared with an expected value, so that it is possible to immediately check a single function of the ECC code generating circuit 30.

Figure 3:
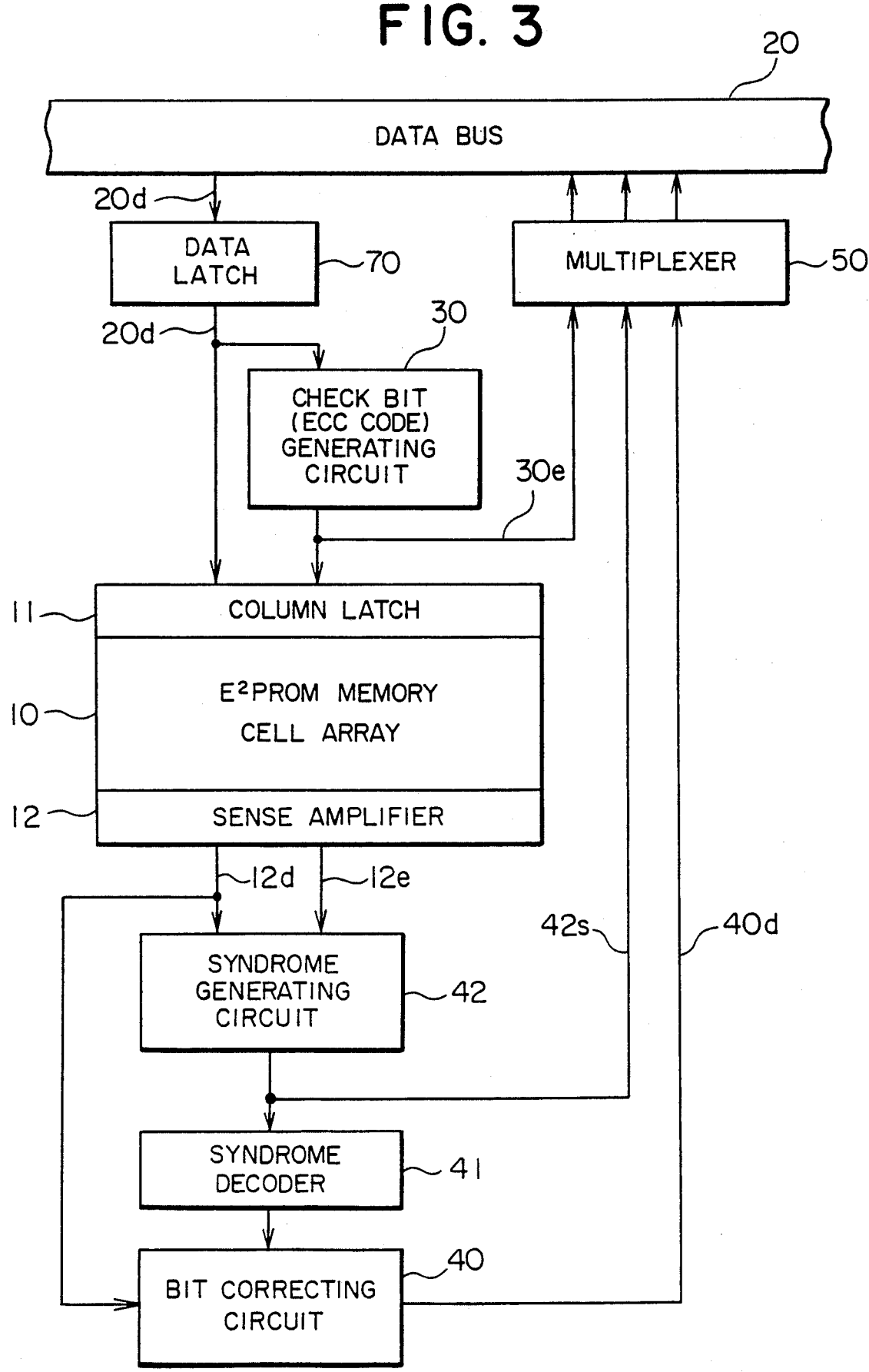
FIG. 3 is a block diagram showing the construction of an E$^2$PROM having an error detecting and correcting function according to another embodiment of the present invention.

In the above-described embodiment, direct reading of the ECC code 30e is realized by providing the ECC code register 60 between the ECC code generating circuit 30 and the data bus 20. However, in order to realize the direct reading of the ECC code 30e, as shown in FIG. 3, a data latch 70 may be disposed between the data bus 20 and the ECC code generating circuit 60 to provide an arrangement in which the ECC code 30e is output to the data bus 20 through a multiplexer 50. In this arrangement, since the write data 20d continues to be output from the data latch 70 during one external writing cycle, the ECC code 30e continues to be output from the ECC code generating circuit 30 to the multiplexer 50. Accordingly, since the ECC code 30e is selectively output to the data bus 20 by the multiplexer 50, it is possible to read out the ECC code 30e directly.

Figure 4:
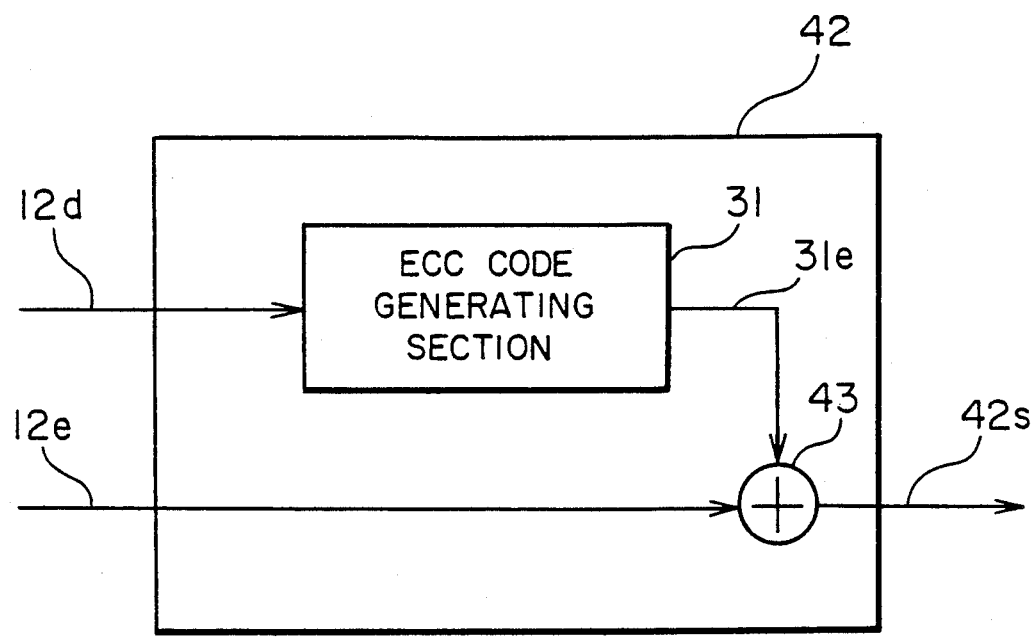
FIG. 4 is a view diagrammatically showing the construction of a syndrome generating circuit for use in the present invention.

In the above-described memory device provided with the ECC code generating circuit, a 4-bit ECC code is calculated in order to detect a 2-bit error or to detect and correct a 1-bit error in the write data, e.g. 8-bit data, supplied from the data bus and data (or extended Hamming code) having a bit length which totals 12 bits is stored (or written into the memory cell array 10). During readout, the readout 8-bit data and the 4-bit ECC code are supplied by the syndrome generating circuit 42. In such a method of detecting and correcting an error by the use of the extended Hamming code, the syndrome generating circuit 42 may be constructed, for example, as shown in FIG. 4.

The operation of the syndrome generating circuit 42 will be explained below. An ECC code generating section 31 generates a second ECC code 31e from the readout data 12d which has been read from a corresponding memory cell. An exclusive OR circuit 43 receives the ECC code 31e and the ECC code 12e read from the memory cell to generate the syndrome 42s of 4 bits. If the second ECC code 31e is completely identical to the readout ECC code 12e, the syndrome 42s assumes "0H" which indicates that there is no error bit. If the second ECC code 31e differs from the readout ECC code 12e, another syndrome is output which corresponds to the position of the error bit or which indicates that a multiple bit error has occurred. The syndrome decoder 41 decodes the syndrome 42s and selects, from eight bits, one bit at which an error has occurred. In the case of a multiple bit error, none of the bits is selected. The bit correcting circuit 40 inverts the bit selected by the decoder 41 for decoding the readout data 12d, and outputs the corrected data 40d.

In such a method, the ECC code generating circuit is completely identical to the circuit portion for regenerating the ECC code from the 8-bit data which has been read from the memory cell array. Accordingly, a single ECC code generating circuit can be provided to serve as both a circuit for generating an ECC code from write data and a circuit for regenerating an ECC code for the syndrome generating circuit.

Figure 5:
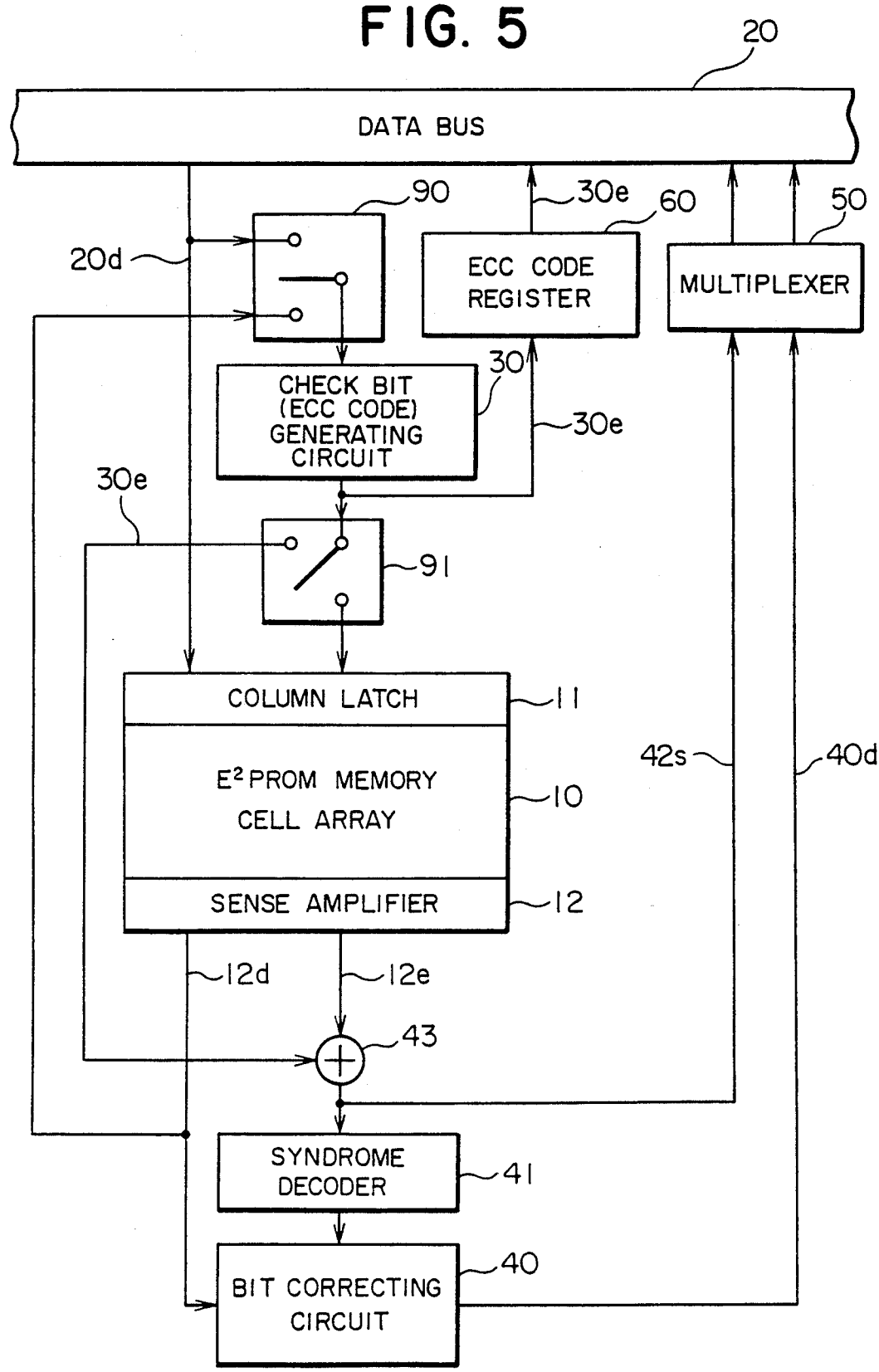
FIG. 5 is a block diagram showing the construction of another embodiment in which the present invention is applied to an E$^2$PROM employing a single ECC code generating circuit during both writing and reading.

FIG. 5 shows a construction in which the present invention is applied to an E$^2$PROM device including an ECC code generating circuit. The embodiment of FIG. 5 corresponds to that of FIG. 2. In FIG. 5, during external writing, a change-over switch 90 is switched to supply the write data 20d to the ECC code generating circuit 30, while a change-over switch 91 is switched to supply the thus-generated ECC code 30e to the column latch 11. During data reading, the change-over switch 90 is switched to supply the readout data 12d to the ECC code generating circuit 30, while the change-over switch 91 is switched to supply the thus-generated ECC code 30e to the exclusive OR circuit 43. Then, the syndrome 42s is generated by the operation of the exclusive OR circuit 43 on the generated ECC code 30e and the readout ECC code 12e. The operation of the remaining portion is identical to the previously-described operation. With this construction, the proportion of a logic section which can be efficiently checked by the present invention can be increased and, therefore, the invention is advantageous in terms of the chip area required.

FIG. 6 shows a still another embodiment employing an E$^2$PROM device including an ECC code generating circuit. The embodiment of FIG. 6 corresponds to that of FIG. 3. In a manner similar to that used in the embodiment of FIG. 3, the data latch 70 is disposed between the data bus 20 and the ECC code generating circuit 30, and the ECC code 30e is supplied to the data bus 20 through the multiplexer 50. Thus, direct readout of the ECC code 30e is realized. In this construction, during external writing, the change-over switch 90 is switched to supply the write data 20d from the data latch 70 to the ECC code generating circuit 30, while the change-over switch 91 is switched to supply the thus-generated ECC code 30e to the column latch When data writing is executed, the data latch 70 continues to output the write data 20d until the next writing is started. Therefore, the ECC code generating circuit 30 continues to output the ECC code 30e to the multiplexer 50. Accordingly, since the ECC code 30e is selectively output from the multiplexer 50 to the data bus 20, it is possible to read out the ECC code 30e directly. During data reading, the change-over switch 90 is switched to supply the readout data 12d to the ECC code generating circuit 30, while the change-over switch 91 is switched to supply the regenerated ECC code 30e to the exclusive OR circuit 43. Then, the syndrome 42s is generated by the operation of OR circuit 43 on the generated ECC code 30e and the readout ECC code 12e.

The modification of the embodiment which was described in connection with FIG. 2 can be applied to the construction of FIG. 5. More specifically, a linear feedback shift register can be used as an ECC code register to collectively check the functions of the ECC code generating circuit with respect to a plurality of write data.

What is claimed is:

1. A memory system for storing data and detecting and correcting an error in the stored data comprising:
   an error checking and correcting (ECC) code generating circuit having an input connected to a data bus for generating an error checking and correcting code in response to a data word supplied from the data bus during data writing, said ECC code generating circuit having an output from which the ECC code is output, the data word and the ECC code together constituting a systematic code;
   a memory device having a first input connected to the data bus to receive the data word and a second input connected to the output of said ECC code generating circuit for receiving and storing the systematic code and having an output;
   an error detecting and correcting system connected to the output of said memory device for reading the systematic code, calculating a syndrome from the systematic code read from said memory device, decoding the syndrome to determine whether an error exists in a bit in the data word and to identify a bit position at which an error has occurred, and correcting the error contained in the data word by inverting the bit of the data word at the bit position at which the error was identified;
   output means for outputting the corrected data word from the error detecting and correcting system to said data bus; and
   code reading means for reading out the ECC code generated by said ECC code generating circuit directly into said data bus whereby functional checking of said code generating circuit can be immediately performed without being influenced by said memory device.

2. The memory system according to claim 1 wherein said code reading means includes a register having an input connected to the output of said ECC code generating circuit and an output connected to said data bus for holding the ECC code generated by said ECC code generating circuit and outputting the ECC code to said data bus.

3. The memory system according to claim 2 wherein said error detecting and correcting system includes a circuit for selectively supplying the data word read from said memory device to the input of said ECC code generating circuit, for regenerating the ECC code corresponding to the data word read from said memory device by said ECC code generating circuit, and for applying an exclusive-OR function to the regenerated ECC code and the ECC code read from said memory device, thereby generating a syndrome.

4. The memory system according to claim 2 wherein said register is a linear feedback shift register (LFSR) for controlling said memory device to sequentially input a plurality of test patterns to said ECC code generating circuit, to compress the ECC code output from said ECC code generating circuit in accordance with the test patterns, and to check said ECC code generating circuit on the basis of the result.

5. The memory system according to claim 1 wherein said code reading means includes:
- a data latch circuit having an input connected to said data bus and an output connected to the input of said ECC code generating circuit for holding a data word written from said data bus and inputting the data word into said ECC code generating circuit; and
- a multiplexer connected between the output of said ECC code generating circuit and said data bus for selectively outputting the ECC code generating by said ECC code generating circuit to said data bus.

6. The memory system according to claim 5 wherein said error detecting and correcting system includes a circuit for selectively supplying the data word read from said memory device to the input of said ECC code generating circuit, for regenerating the ECC code corresponding to the data word read from said memory device by said ECC code generating circuit, and for applying an exclusive-OR function to the regenerated ECC code and the ECC code read from said memory device, thereby generating a syndrome.

7. A memory system for storing data received over a data bus and for detecting and correcting errors in the stored data comprising:
- a first error checking and correcting (ECC) code generating circuit having an input connected to a data bus for receiving a data word to be stored and an output for outputting a first ECC code corresponding to the data word, the data word and the first ECC code together constituting a systematic code;
- a memory device having a first input connected to the data bus to receive the data word and a second input connected to the output of said first ECC code generating circuit for receiving and storing the systematic code, said memory device having an output for outputting the stored systematic code;
- a syndrome generating a circuit having an input connected to the output of said memory device for receiving the stored systematic code from said memory device and having an output for generating a syndrome which indicates whether an error is present in a bit in the stored data word and outputting the syndrome at the output;
- a syndrome decoder having an input connected to the output of said syndrome generating circuit for receiving the syndrome and decoding the syndrome to identify a bit position of the data word at which an error has occurred and having an output for outputting a decoded word identifying the bit position at which an error was identified;
- a bit correcting circuit having a first input connected to the output of said syndrome decoder for receiving the decoded word and a second input connected to the output of said memory device for receiving the stored data word and inverting the bit of the stored data word corresponding to the identified bit position, thereby correcting the error;
- a multiplexer having a plurality of input including a first input connected to the output of said syndrome generating circuit and a second input connected to the output of said bit correcting circuit and having a first output of connected to the data bus for selectively enabling one of the first and second inputs to be output from said memory system; and
- means for outputting the first ECC code from the output of said first ECC code generating circuit to the data bus separately from the first ECC code of the systematic code stored in said memory device.

8. A memory system according to claim 7 wherein said means for outputting includes an ECC code register having an input connected to the output of said first ECC code generating circuit and an output connected to said data bus.

9. A memory system according to claim 7 wherein said means for outputting comprises a third input of said multiplexer connected to the output of said first ECC code generating circuit and a second output of said multiplexer connected to the data bus for outputting to the data bus the first ECC code from the output of said first ECC code generating circuit.

10. A memory system according to claim 9 comprising a data latch having an input connected to the data bus and an output connected to the input of said first ECC code generating circuit and to the first input of said memory device.

11. A memory system according to claim 7 wherein said syndrome generating circuit includes (i) a second ECC code generating circuit having an input connected to the output of said memory device for receiving the stored data word of the systematic code from said memory device and an output for outputting a second ECC code corresponding to the stored data word and (ii) an EXCLUSIVE-OR device having a first input connected to the output of the first ECC code generating circuit for receiving the first ECC code, a second input connected to the output of the second ECC code generating circuit for receiving the second ECC code, and an output for outputting an EXCLUSIVE-OR function of the first and second ECC codes as the syndrome.

12. A memory system according to claim 7 comprising:
- a first switch having a first fixed contact connected to the data bus, a second fixed contact connected to the output of said memory device for receiving the stored data word, and a movable contact connected to the input of said first ECC code generating circuit;
- a second switch having a movable contact connected to the output of first ECC code generating circuit, a first fixed contact connected to the input of said memory device, and a second fixed contact; and
- an EXCLUSIVE-OR device having a first input connected to the output of said memory device for receiving the stored ECC code, a second input connected to the second fixed contact of said second switch, and an output, wherein, when the movable and first fixed contacts of said first switch are electrically connected to each other and the movable and first fixed contacts of said second switch are electrically connected to each other, the data word from the data bus and the first ECC code generated for the data word by said first ECC code generating circuit are written into said memory device and wherein, when the movable and second fixed contacts of said first switch are electrically connected to each other and the movable and second fixed contacts of said second switch are electrically connected to each other, said syndrome generating circuit comprises said first ECC code generating circuit and said EXCLUSIVE-OR device, the systematic code is read from said memory device, whereby errors in the data word of the systematic code are detected and corrected and the corrected data word is output to the data bus.

* * * * *

UNITED STATES PATENT AND TRADEMARK OFFICE
CERTIFICATE OF CORRECTION

PATENT NO. : 5,056,089

DATED : October 8, 1991

INVENTOR(S) : Furuta et al

It is certified that error appears in the above-identified patent and that said Letters Patent is hereby corrected as shown below:

Column 7, line 36, change "a" to --the--;
       line 48, after "generating" delete "a".

Signed and Sealed this

Twenty-third Day of March, 1993

Attest:

STEPHEN G. KUNIN

*Attesting Officer*      *Acting Commissioner of Patents and Trademarks*